(12) United States Patent
Zemek

(10) Patent No.: US 11,748,671 B2
(45) Date of Patent: Sep. 5, 2023

(54) VEHICLE MANAGEMENT SYSTEM AND VEHICLE MANAGEMENT METHOD

(71) Applicants: Nissan Motor Co., Ltd., Kanagawa (JP); RENAULT S.A.S., Boulogne-Billancourt (FR)

(72) Inventor: Radim Zemek, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 84 days.

(21) Appl. No.: 17/269,399

(22) PCT Filed: Aug. 20, 2018

(86) PCT No.: PCT/IB2018/001046
§ 371 (c)(1),
(2) Date: Feb. 18, 2021

(87) PCT Pub. No.: WO2020/039222
PCT Pub. Date: Feb. 27, 2020

(65) Prior Publication Data
US 2021/0248522 A1 Aug. 12, 2021

(51) Int. Cl.
*G06Q 10/02* (2012.01)
*G06Q 10/0631* (2023.01)
*G06Q 50/30* (2012.01)

(52) U.S. Cl.
CPC ....... *G06Q 10/02* (2013.01); *G06Q 10/06312* (2013.01); *G06Q 50/30* (2013.01)

(58) Field of Classification Search
None
See application file for complete search history.

(56) References Cited

U.S. PATENT DOCUMENTS 8,448,739 B2 * 5/2013 Kolich ................ B60H 3/0007
180/271
2011/0246252 A1 10/2011 Uesugi
(Continued)

FOREIGN PATENT DOCUMENTS

JP 2009-035173 A 2/2009
JP 2011-253257 A 12/2011
(Continued)

OTHER PUBLICATIONS

Gregory Leonardos, David Kendall & Nancy Barnard, Odor Threshold Determinations of 53 Odorant Chemicals, Mar. 16, 2012 (originally published Feb. 1969), Journal of the Air Pollution Control Association (Year: 2012).*

*Primary Examiner* — Jeff Zimmerman
*Assistant Examiner* — Matthew Parker Goodman
(74) *Attorney, Agent, or Firm* — Osha Bergman Watanabe & Burton LLP

(57) ABSTRACT

A vehicle management system, an on-vehicle system, and a vehicle management method are described that are capable of providing a vehicle to a user where an odor level in the vehicle fulfills a predetermined criterion. The vehicle management system selects a provision option of the vehicle, corresponding to the odor level if the odor level does not fulfill the predetermined criterion, and executes notification or vehicle control associated with the provision option.

9 Claims, 12 Drawing Sheets

(56) References Cited

U.S. PATENT DOCUMENTS

| | | | |
|---|---|---|---|
| 2013/0066688 A1* | 3/2013 | Pinkus | G06Q 10/0639 |
| | | | 705/7.41 |
| 2013/0304278 A1 | 11/2013 | Chen | |
| 2014/0060150 A1* | 3/2014 | Shaw | H04W 4/21 |
| | | | 222/52 |
| 2018/0057013 A1* | 3/2018 | Mullett | B60H 1/267 |
| 2018/0162301 A1 | 6/2018 | Meng et al. | |
| 2018/0186212 A1 | 7/2018 | Kundu et al. | |
| 2018/0202822 A1* | 7/2018 | DeLizio | B60R 25/24 |
| 2019/0080264 A1* | 3/2019 | Wasekura | G06Q 30/0207 |
| 2019/0196503 A1* | 6/2019 | Abari | G06Q 10/00 |
| 2020/0111189 A1* | 4/2020 | Yeung | G06Q 10/02 |

FOREIGN PATENT DOCUMENTS

| | | |
|---|---|---|
| JP | 2014-237383 A | 12/2014 |
| JP | 2015-204005 A | 11/2015 |
| JP | 2018-055485 A | 4/2018 |
| WO | 2017/169203 A1 | 10/2017 |

* cited by examiner

FIG. 9

| TYPE | COMPONENT a | COMPONENT b | COMPONENT c | COMPONENT d | COMPONENT e | COMPONENT f | ... |
|---|---|---|---|---|---|---|---|
| FLOWER | 60 | 20 | 20 | - | - | - | - |
| CIGARETTE | - | - | - | 50 | 50 | - | - |
| VOMIT | - | - | 10 | - | - | 70 | 20 |
| COMBINATION 1 | 30 | 5 | 5 | 35 | 25 | - | - |

FIG. 10

| ODOR SENSOR | TIME | ODOR LEVEL | FLOWER (X) | CIGARETTE (Y) | VOMIT (Z) | ... | POWER WINDOW | AIR CONDITIONING SYSTEM |
|---|---|---|---|---|---|---|---|---|
| | t1 | 80 | 0 | 50 | 30 | | CLOSE | OFF |
| | t2 | 50 | 0 | 20 | 30 | | OPEN | ON |
| | t3 | 20 | 0 | 0 | 20 | | OPEN | ON |

FIG. 11

| USER | FAVORABLE ODOR | UNFAVORABLE ODOR | SENSITIVITY | THRESHOLD SETTING LEVEL |
|---|---|---|---|---|
| AAA | FLOWER | CIGARETTE | HIGH | 40 |
| BBB | ODORLESS | SULFIDE | LOW | 60 |

VEHICLE MANAGEMENT SYSTEM AND VEHICLE MANAGEMENT METHOD

TECHNICAL FIELD

The present invention relates to a vehicle management system and a vehicle management method that manage a vehicle provided to a user.

BACKGROUND ART

A vehicle remote diagnosis system that transmits a diagnostic data of a vehicle, which is output by an onboard computer of the vehicle, to a remote diagnosis center through a communication network by using a smartphone into which a dedicated application program is installed, has been known (see Patent Literature 1).

In this vehicle remote diagnosis system, in a case in which a code that indicates a trouble part (Diagnostic Trouble Codes), is not included the diagnostic data, the application program asks a user whether an odor or the like is generated and then transmits presence/absence of the odor or the like input by the user, to the remote diagnosis center.

CITATION LIST

Patent Literature

[PTL 1] U.S. Unexamined Patent Application Publication No. 2013/0304278

SUMMARY OF INVENTION

In a vehicle such as a taxi or a vehicle used for a car sharing for which one single vehicle is consequently provided for many unspecified users, it is not preferable to provide the vehicle as it is if the odor level in the vehicle does not fulfill a predetermined criterion.

However, the vehicle remote diagnosis system disclosed in Patent Literature 1 neither shows nor implies any measures to solve such a problem.

An object of the present invention is, in consideration of the problem described above, to provide a vehicle management system and a vehicle management method capable of providing a vehicle to a user under appropriate conditions according to an odor level in the vehicle.

A vehicle management system according to one aspect of the present invention acquires a vehicle interior odor data output by an odor sensor arranged in a vehicle, and determines a type of a vehicle interior odor based on the vehicle interior odor data. The vehicle management system acquires an odor level to be associated with the type of the vehicle interior odor from the vehicle interior odor data, and determines whether the odor level fulfills a predetermined criterion.

A vehicle management system according to another aspect of the present invention acquires a vehicle interior odor data output by an odor sensor arranged in a vehicle, and determines whether an odor level that is based on the vehicle interior odor data fulfills a predetermined criterion. In a case in which it is determined that the odor level does not fulfill the predetermined criterion, the vehicle management system selects a provision option of the vehicle associated with the odor level, and executes notification or vehicle control associated with the provision option.

BRIEF DESCRIPTION OF DRAWINGS

FIG. 9 is a table illustrating a configuration example of a vehicle interior odor database 140 (vehicle interior odor type database).

FIG. 10 is a table illustrating a configuration example of a vehicle interior odor database 140 (odor level database for each vehicle).

FIG. 11 is a table illustrating a configuration example of a user information database 150.

DESCRIPTION OF EMBODIMENTS

Hereinafter, embodiments will be described with reference to the drawings. The same reference signs or similar reference signs are assigned to the same functions or the same components and the description thereof is therefore omitted.

(A Whole Configuration of a Vehicle Management System)

Figure 1:
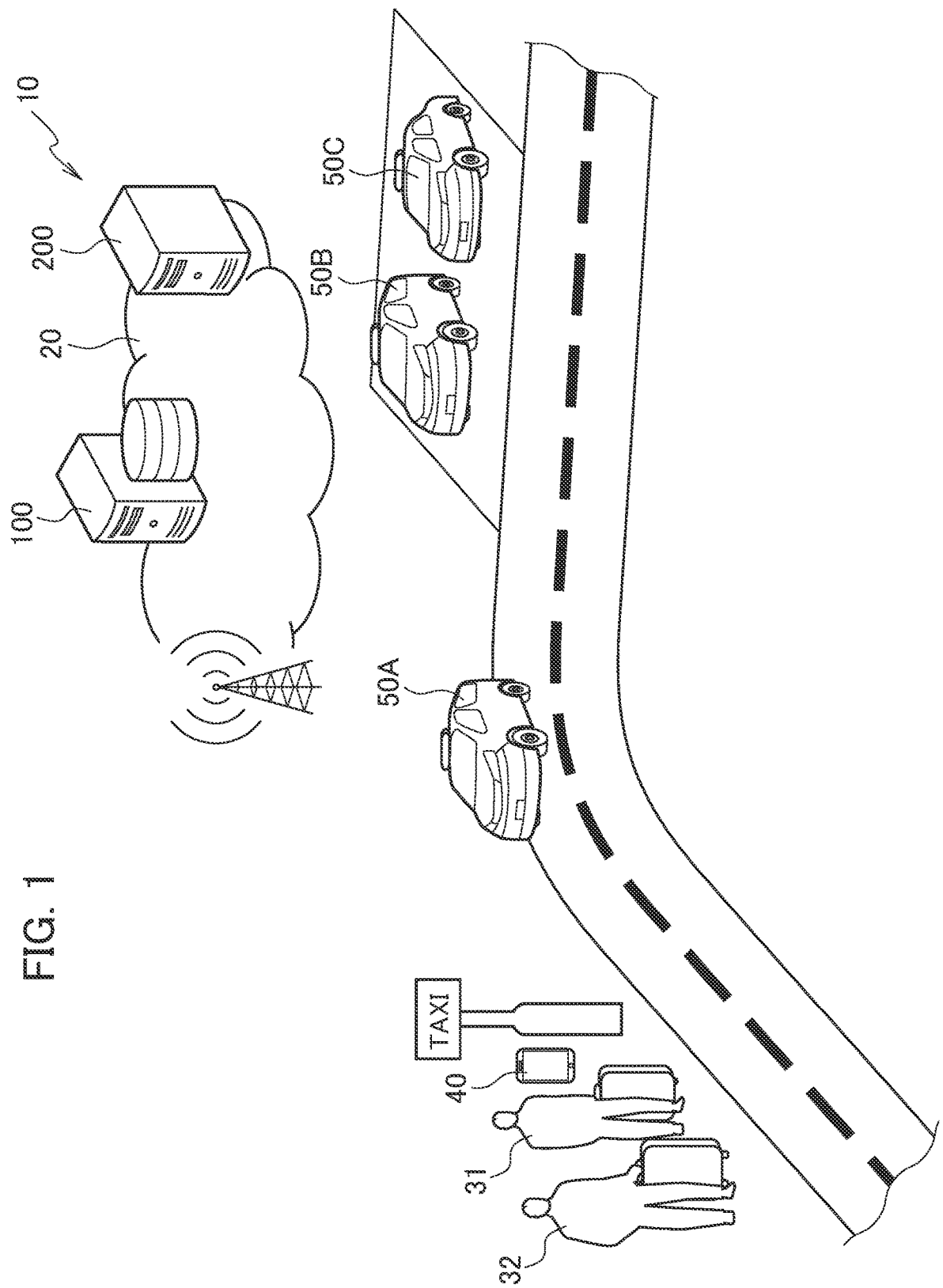
FIG. 1 is a whole schematic configuration of a vehicle management system 10.

FIG. 1 is a whole schematic configuration of a vehicle management system 10 according to the present embodiment. As shown in FIG. 1, the vehicle management system 10 includes a database server 100 and a vehicle management server 200 located on a network cloud 20.

The network cloud 20 is a communication network that makes it possible to transmit information via wired communication or wireless communication. The network cloud 20 typically includes an internet, and further includes various information provision services (weather information, traffic information, and the like), a storage service, and an application service that are provided on the internet.

A part or a whole of the functions of the database server 100 and the vehicle management server 200 may be virtually performed by the service provided on the network cloud 20.

The vehicle management system 10 manages a vehicle 50A, a vehicle 50B and a vehicle 50C. The vehicles managed by the vehicle management system 10 are merely example, and therefore, in actual, much more vehicles are managed.

In the present embodiment, the vehicle 50A to the vehicle 50C are vehicles for business use, specifically taxies, used by a user 31 and a user 32 (the users are not limited to the user 31 and the user 32). In particular in the present embodiment, each of the vehicle 50A to the vehicle 50C has an autonomous driving function of level 4 or more that does not need a driver. However, each of the vehicle 50A to the vehicle 50C may not have such an autonomous driving function.

A communication terminal 40 is formed as a mobile terminal device used by the user 31 (or the user 32). Typically, the communication terminal 40 is a smartphone or a tablet device having a wireless communication function. The communication terminal 40 communicates with the vehicle management server 200 or the like via the network cloud 20.

The database server 100 stores information relating to the vehicle and the user. Specifically, the database server 100 stores a state of each of the vehicle 50A to the vehicle 50C, in particular in the present embodiment, information relating to a vehicle interior odor. Further, the database server 100 stores an attribution of each of the user 31 and the user 32, in particular information (user information) relating to tolerance or the like to the vehicle interior odor.

The vehicle management server 200 manages the state of the vehicle and performs various control of the vehicle. Specifically, the vehicle management server 200 manages each of the odor levels in the vehicle 50A to vehicle 50C and performs control of the equipment (power window, air conditioning system, or the like) mounted on the vehicle or the autonomous driving function.

In the present embodiment, the vehicle management system that manages each of the states of the vehicle 50A to the vehicle 50C is formed by the database server 100 and the vehicle management server 200. The vehicle management system includes a communication interface that communicates with the vehicle 50A to the vehicle 50C. The vehicle management system is a server, specifically a server computer, separated from the vehicle.

(Functional Block Configurations of the Vehicle and the Vehicle Management System)

Next, functional block configuration of each of the vehicle 50A to the vehicle 50C and the vehicle management system 10 will be described.

(1) Vehicle 50A to Vehicle 50C

Figure 2:
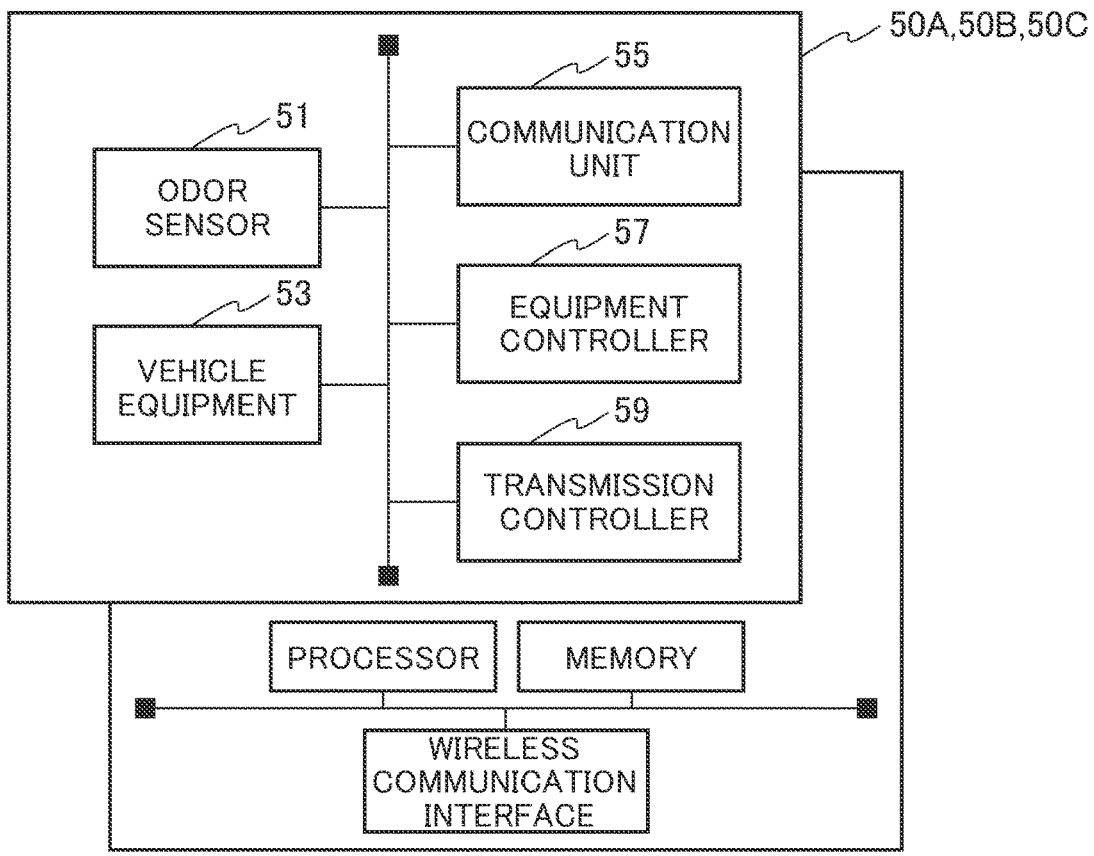
FIG. 2 is a diagram of a functional block configuration of each of vehicles 50A to 50C.

FIG. 2 is a diagram of the functional block configuration of each of the vehicle 50A to the vehicle 50C. Specifically, FIG. 2 shows only the functional block relating to acquisition of the vehicle interior odor data and control of the vehicle equipment.

More specifically, FIG. 2 shows an on-vehicle system mounted on the vehicle, including at least a processor and a memory. The on-vehicle system includes an odor sensor 51 that detects the vehicle interior odor of the vehicle 50A and a wireless communication interface that communicates with the server (database server 100 or vehicle management server 200).

As shown in FIG. 2, the vehicle 50A (the same shall be applied to the vehicle 50B and the vehicle 50C, hereinafter the same) is provided with the odor sensor 51, vehicle equipment 53, a communication unit 55, an equipment controller 57, and a transmission controller 59.

The odor sensor 51 detects an odor in the vehicle 50A (vehicle interior odor). Specifically, the odor sensor 51 is arranged in a passenger cabin or a luggage cabin of the vehicle 50A. The odor sensor 51 may be arranged for each seat in the passenger cabin.

The type of the odor sensor 51 is not especially limited, and therefore a semiconductor type sensor or a crystal oscillator type sensor may be adopted. The odor sensor 51 may be called an odor air sensor. The odor sensor 51 detects an odor component that flows in the air of the vehicle and stimulates olfaction so as to output a numerical data (vehicle interior odor data) for each odor component. That is, the vehicle interior odor data output by the odor sensor 51 includes a rate of each odor component and the intensity of each odor component.

The vehicle equipment 53 includes various devices mounted on the vehicle 50A. In particular in the present embodiment, the vehicle equipment 53 includes equipment relating to the autonomous driving of the vehicle 50A, specifically an accelerator, a brake, steering-related equipment, and a power source such as a battery. The power source provides electric power to electronic components that are included in the odor sensor 51, the vehicle equipment 53, the communication unit 55, the equipment controller 57, and the transmission controller 59.

Further, the vehicle equipment 53 includes a camera that detects getting on and off of passengers of the vehicle, and a seating sensor of the seat.

In the present embodiment, the vehicle equipment 53 includes all equipment that can be used to reduce the vehicle interior odor. Specifically, the vehicle equipment 53 includes an electrically openable window such as a power window, and a door and a tail gate. Further, the vehicle equipment 53 includes an air conditioning system (fan, heater, thermometer, hygrometer, and air conditioner), and an air cleaner. Further, the vehicle equipment 53 may include an ultraviolet (UV) lamp.

The communication unit 55 transmits/receives a wireless signal to/from an access point (radio base station) near the vehicle 50A and transmits/receives various data via the access point.

The communication unit 55 may be mounted as a communication module to the vehicle 50A, or may be implemented by a communication terminal such as a smartphone. A mobile communication network such as 4G (LTE) and 5G is typically utilized. Other wireless communication system (wireless LAN) may be also utilized.

The equipment controller 57 controls the vehicle equipment 53. Specifically, the equipment controller 57 controls the vehicle equipment 53, for example opening/closing of the window and the operation of the air conditioning system, based on instructions from the vehicle management system 10 (vehicle management server 200).

Further, the equipment controller 57 receives a command (second command) transmitted by the vehicle management server 200 based on the vehicle interior odor data obtained by controlling the odor sensor 51 and controls at least one of the air conditioning system and the opening/closing of the window.

Further, the equipment controller 57 controls the equipment relating to the autonomous driving (accelerator, brake, and steering-related equipment) based on instructions from the vehicle management system 10 (vehicle management server 200).

The transmission controller 59 controls transmission of the vehicle interior odor data. Specifically, the transmission controller 59 receives a command (first command) transmitted by the vehicle management server 200 and controls the odor sensor 51. The transmission controller 59 transmits the vehicle interior odor data obtained by controlling the odor sensor 51, to the vehicle management server 200 via the wireless communication interface.

(2) Database Server 100

Figure 3:
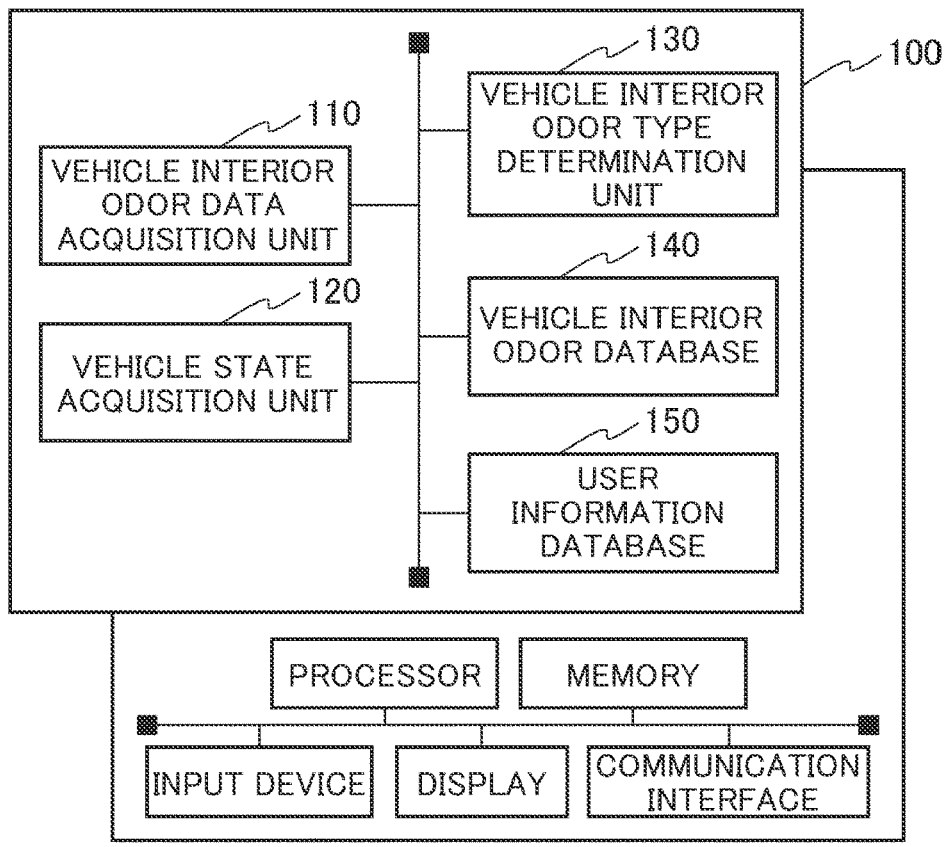
FIG. 3 is a diagram of a functional block configuration of a database server 100.

FIG. 3 is a diagram of a functional block configuration of the database server 100. As shown in FIG. 3, the database server 100 is provided with a vehicle interior odor data acquisition unit 110, a vehicle state acquisition unit 120, a vehicle interior odor type determination unit 130, a vehicle interior odor database 140, and a user information database 150.

The database 100 is implemented by executing a program (software) on a general server computer having a processor, a memory, an input device, a display (not necessarily), and a communication interface (communication IF).

The vehicle interior odor data acquisition unit 110 acquires the vehicle interior odor data output by the odor sensor 51 arranged in the vehicle 50A.

Specifically, the vehicle interior odor data acquisition unit 110 acquires the vehicle interior odor data transmitted from the vehicle 50A via the network cloud 20. That is, the vehicle interior odor data acquisition unit 110 acquires the vehicle interior odor data from the vehicle 50A via the communication interface.

The vehicle interior odor data acquired by the vehicle interior odor data acquisition unit 110 is used for forming the vehicle interior odor database 140 (odor level database for each vehicle).

In a case in which the vehicle odor data acquisition unit 110 detects the presence of booking information of the use of the vehicle 50A, the vehicle interior odor data acquisition unit 110 requests the vehicle interior odor data to the vehicle 50A and acquires the vehicle interior odor data.

The vehicle state acquisition unit 120 acquires the state of the vehicle 50A. Specifically, the vehicle state acquisition unit 120 acquires the state of the vehicle equipment 53. More specifically, the vehicle state acquisition unit 120 acquires an opening/closing state of the window, a temperature and humidity in the vehicle, a state of the air conditioning system (for example, ON/OFF data of the fan of the air conditioning system, the set temperature, presence/absence of introduction of outer air, or ON/OFF data of the air cleaner), and the like.

Further, the vehicle state acquisition unit 120 may acquire a present position of the vehicle 50A, a travelling route of the vehicle 50A, and the like.

The vehicle interior odor type determination unit 130 determines the type of the vehicle interior odor in the vehicle 50A. Specifically, the vehicle interior odor type determination unit 130 determines the type of the vehicle interior odor generated in the vehicle 50A, based on the vehicle interior odor data acquired by the vehicle interior odor data acquisition unit 110.

The type of the vehicle interior odor is not especially limited as long as it can be detected using the odor sensor 51. Considering that the vehicle 50A is a taxi used by many unspecified users, examples of the vehicle interior odor mainly include odors of flowers, cigarettes (including a vehicle interior odor caused by not only smoking in the vehicle but also boarding of the smoker (smoker)), vomit, sweat, and an odor of pets.

The vehicle interior odor database 140 is formed based on the vehicle interior odor data. In the present embodiment, the vehicle interior odor database 140 is formed by a vehicle interior odor type database and an odor level database for each vehicle.

FIG. 9 shows a configuration example of the vehicle interior odor database 140 (vehicle interior odor type database). Further, FIG. 10 shows a configuration example of the vehicle interior odor database 140 (odor level database for each vehicle).

As shown in FIG. 9, the vehicle interior odor type database is formed by rates of the vehicle interior odors (odor components) associated with the types of the vehicle interior odors. For example, in a case of "Flower", a component a is 60%, a component b is 20%, and a component c is 20%.

For example, the components a, b, and c correspond to hydrogen sulfide, acetic acid, and methyl mercaptan, respectively, but not limited thereto. Therefore, a component of the vehicle interior odor that causes a passenger to feel disgust and sufficiently distinguishes the types of the vehicle interior odors may be adopted.

Similarly, the numerical values (%) for respective components are defined also in other types of the vehicle interior odors (Cigarette and Vomit). Or alternatively, the numerical values (%) for respective components may be defined in a case in which plural types (for example, "Flower" and "Cigarette") of the vehicle interior odors are combined set as "Combination 1".

The each numerical value that forms the vehicle interior odor type database may be renewed as needed based on the vehicle interior odor data acquired by the vehicle interior odor data acquisition unit 110.

As shown in FIG. 10, the odor level database for each vehicle is formed by the odor level to be associated with the type (Flower (X), Cigarette (Y), and Vomit (Z)) of the vehicle interior odor, which are based on the vehicle interior odor data output by the odor sensor 51, the total value of the odor levels in each type, and the state of the vehicle equipment 53.

Further, the odor level database for each vehicle may include the odor level based on the vehicle odor data output by the odor sensor 51 at different times (t1 and t2), and the states of the vehicle equipment 53 at each time.

The user information database 150 is formed by the information of the user 31 and the user 32 that use the vehicle 50A to the vehicle 50C, namely taxis.

FIG. 11 shows a configuration example of the user information database 150. As shown in FIG. 11, the user information database 150 is formed by the information relating to the odors for respective users. The user 31 corresponds to "User AAA", and the user 32 corresponds to "User BBB" in the table.

Specifically, the user information database 150 is formed by "Favorable odor" that the user likes, "Unfavorable odor" that the user dislikes, "Sensitivity" to the odor, and "Threshold setting level". The threshold setting level is used to define the odor level that the user can accept.

The information that forms the user information database 150 may be registered by the user in advance, or may be registered by the user using the communication terminal 40 when using the taxi (requesting vehicle dispatching of the taxi). Here, the vehicle dispatching denotes to provide the vehicle (either of the vehicle 50A to the vehicle 50C) to a place where the user boards at a scheduled time. That is, the vehicle is set in a state where the user can use, through the vehicle dispatching.

(3) Vehicle Management Server 200

Figure 4:
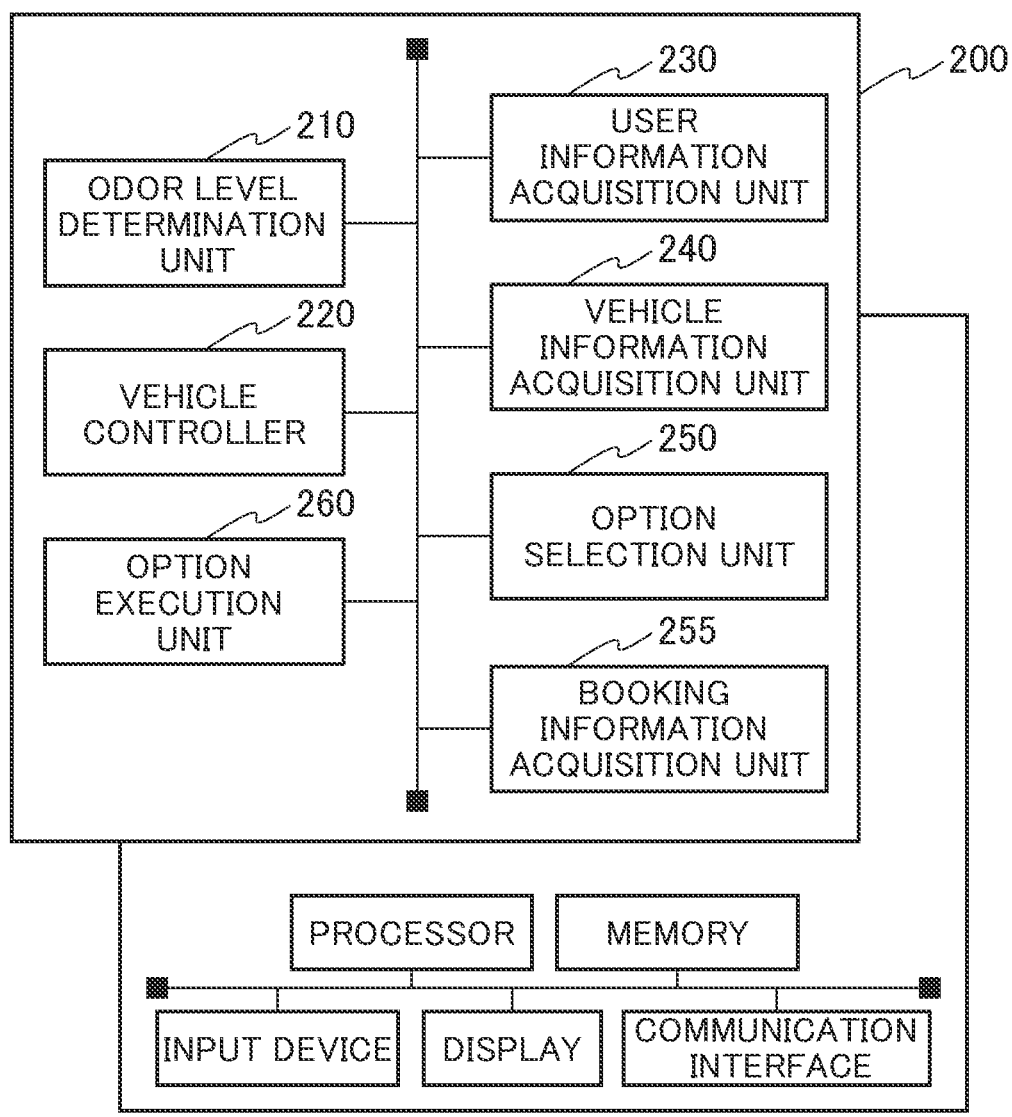
FIG. 4 is a diagram of a functional block configuration of a vehicle management server 200.

FIG. 4 is a diagram of a functional block configuration of the vehicle management server 200. As shown in FIG. 4, the vehicle management server 200 is provided with an odor level determination unit 210, a vehicle controller 220, a user information acquisition unit 230, a vehicle information acquisition unit 240, an option selection unit 250, a booking information acquisition unit 255, and an option execution unit 260.

The vehicle management server 200 is implemented by executing a program (software) on a general server computer having a processor, a memory, an input device, a display (not necessarily), and a communication interface (communication IF).

The odor level determination unit 210 determines whether the odor level, which is based on the vehicle interior odor data, fulfills a predetermined criterion.

Specifically, the odor level determination unit 210 acquires the vehicle interior odor level to be associated with the type of the vehicle interior odor, from the vehicle interior odor data. Further, the odor level determination unit 210 determines whether the acquired odor level fulfills the predetermined criterion.

More specifically, as shown in FIG. 10, the odor level determination unit 210 acquires the odor levels to be associated with the types of the vehicle interior odors, and the total value of the odor levels in each type, for each vehicle.

The odor level is a numerical value that indicates the intensity of the vehicle interior odor in each type. The odor level may be an absolute value or an indexed value (index) against the maximum value of 100.

In the present embodiment, as shown in FIG. 10, the odor level determination unit 210 acquires an odor level (first odor level) at a first time (t1) and an odor level (second odor level) at a second time (t2) after the first time.

The odor level determination unit 210 determines whether the odor level (for example, the total value of the odor levels at a vehicle dispatching time (t3) after the time t2), which is presumed based on the difference between the total value ("80" in the figure) of the odor levels at the time t1 and the total value ("50" in the figure) of the odor levels at the time t2, fulfills the predetermined criterion.

The predetermined criterion may be defined against the total value of the odor levels or defined for each type of the vehicle interior odor. Further, as described below, the predetermined criterion may be dynamically changed based on the user information or the vehicle information.

The odor level determination unit 210 determines whether the odor level acquired after the vehicle 50A is controlled by the vehicle controller 220, fulfills the predetermined criterion. That is, the odor level determination unit 210 determines whether the odor level fulfills the predetermined criterion after the control associated with reducing of the odor level is executed to the vehicle 50A by the vehicle controller 220.

Further, the odor level determination unit 210 may determine whether the odor level fulfills the predetermined criterion that is based on the user information. Specifically, the odor level determination unit 210 changes the predetermined criterion set as default, based on the contents of the user information database 150 shown in FIG. 11.

For example, as shown in FIG. 11, in a case in which "Sensitivity" to the odor is high and the threshold setting level is low ("40" in the figure), the predetermined criterion set as default is changed to be high in accordance with the value of the threshold setting level (namely, the acceptable odor level is changed to be high).

Further, the odor level determination unit 210 may determine whether the odor level fulfills the predetermined criterion that is based on the vehicle information. Specifically, the odor level determination unit 210 changes the predetermined criterion set as default, based on the type of the vehicle 50A.

For example, the odor level determination unit 210 changes the predetermined criterion in accordance with whether the vehicle 50A is a minivan or a sedan. This is because the acceptable odor level may be different depending on the size of the vehicle (vehicle interior space). Here, the odor level determination unit 210 may change the predetermined criterion in accordance with the type of the vehicle equipment 53 or the environment (temperature and humidity) of the vehicle 50A, other than the size of the vehicle.

The vehicle controller 220 transmits a control data for controlling the vehicle 50A, to the vehicle 50A. In particular in the present embodiment, in a case in which the odor level to be associated with the type of the vehicle interior odor (hereinafter, merely referred to as the odor level) does not fulfill the predetermined criterion, the vehicle controller 220 transmits the control data for controlling the vehicle 50A, to the vehicle 50A, based on the control contents associated to the reducing of the odor level.

As the control contents, the control executed to the vehicle equipment 53 for the purpose of reducing the vehicle interior odor may be adopted. Examples of the control include the control that introduces fresh air or the control that cleans air such as opening of the window, activating of the fan of the air conditioning system, temperature adjusting of the air conditioning system, and activating of the air cleaner. The control contents will be further described in detail below.

Further, the control contents may include travelling for a certain time with the window opened. Further, the control content may include comparing the odor level with the window opened and the odor level with the window closed.

That is, the control data is set to control at least one of the air conditioning system and the opening/closing of the window of the vehicle 50A.

The vehicle controller 220 may transmit a control data that is based on the control contents necessary for dispatching the vehicle 50A to a taxi stand (taxi stand, see FIG. 1), other than the control contents associated with the reducing of the odor level.

The user information acquisition unit 230 acquires the user information of the user (user 31 or user 32) that uses the vehicle 50A to the vehicle 50C, namely taxis. Specifically, the user information acquisition unit 230 acquires the user information including tolerance of the user to the vehicle interior odor.

As shown in FIG. 11, the user information database 150 is formed by the information relating to the odor for each user. The user information acquisition unit 230 acquires the information of the user included in the user information database 150.

The vehicle information acquisition unit 240 acquires the vehicle information including at least one of the type and the environment of the vehicle 50A. Specifically, the vehicle information acquisition unit 240 acquires the type of the vehicle 50A (minivan, sedan, or the like). The type of the vehicle 50A may be stored in advance in the vehicle management server 200, or acquired as needed from an outside via the network cloud 20.

Further, the vehicle information acquisition unit 240 acquires the information such as the temperature and humidity of an outside of the vehicle 50A, the temperature and humidity of an inside of the vehicle 50A, and climate, as the environment of the vehicle 50A. The information may be acquired from the outside via the network cloud 20. The temperature and humidity of the inside of the vehicle 50A or the like may be acquired via the vehicle state acquisition unit 120 of the database server 100.

In a case in which the odor level does not fulfills the predetermined criterion, the option selection unit 250 selects a provision option of the vehicle, corresponding to the odor level.

Specifically, the option selection unit 250 may select a provision option that replaces the vehicle 50A with other vehicle (for example, the vehicle 50B).

Such a provision option is selected, in particular, in a case in which it is determined that the odor level cannot fulfill the predetermined criterion by only controlling the vehicle equipment 53. For example, the option selection unit 250 may select the provision option that replaces the vehicle 50A with other vehicle, based on the type of the vehicle interior odor.

Further, the provision option may be represented as below. Specifically, the vehicle 50A is booked for a future use based on a predetermined condition, and the provision option is a condition for which a part of the predetermined condition is changed. Or alternatively, the provision option is a condition for which either of the vehicle 50A (replacement with other vehicle), a service fee and a vehicle dispatching scheduled time is changed in the predetermined condition.

Further, the option selection unit 250 may select a provision option that reduces the service fee for the vehicle 50A. For example, in a case in which the service fee for the vehicle 50A is set to 300 yen/km as default, the option selection unit 250 reduces the service fee in accordance with the odor level corresponding to the remaining odor in the vehicle 50A.

Such a provision option is selected, in particular, in a case in which the odor level can be made lower than a certain level by controlling the vehicle equipment 53, or a case in which the tolerance of the user to the remaining vehicle interior odor (for example, Cigarette) is high.

The booking information acquisition unit 255 acquires the booking information of the vehicle 50A (to the vehicle 50C). Specifically, the booking information acquisition unit 255 acquires the booking information that indicates the use contents of the vehicle 50A (the use start time, the number of people, the destination, or the like) from the communication terminal 40.

The option execution unit 260 executes notification or vehicle control associated with the provision option selected by the option selection unit 250. Specifically, the option execution unit 260 notifies the communication terminal associated with the user, of the contents of the provision option.

Figure 12:
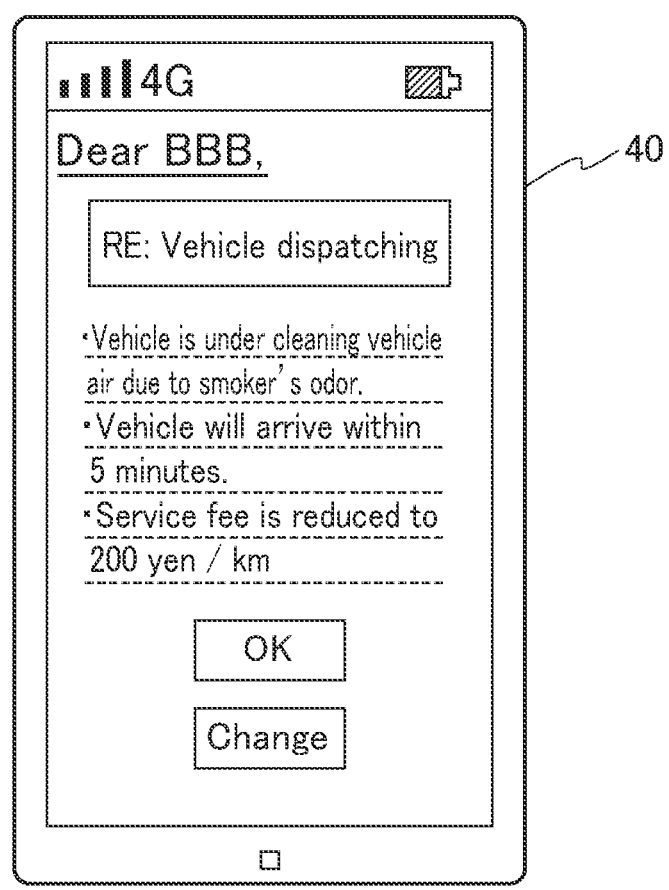
FIG. 12 is a message example (example 1) of a vehicle dispatching content displayed on a communication terminal 40 associated with a user.
Figure 13:
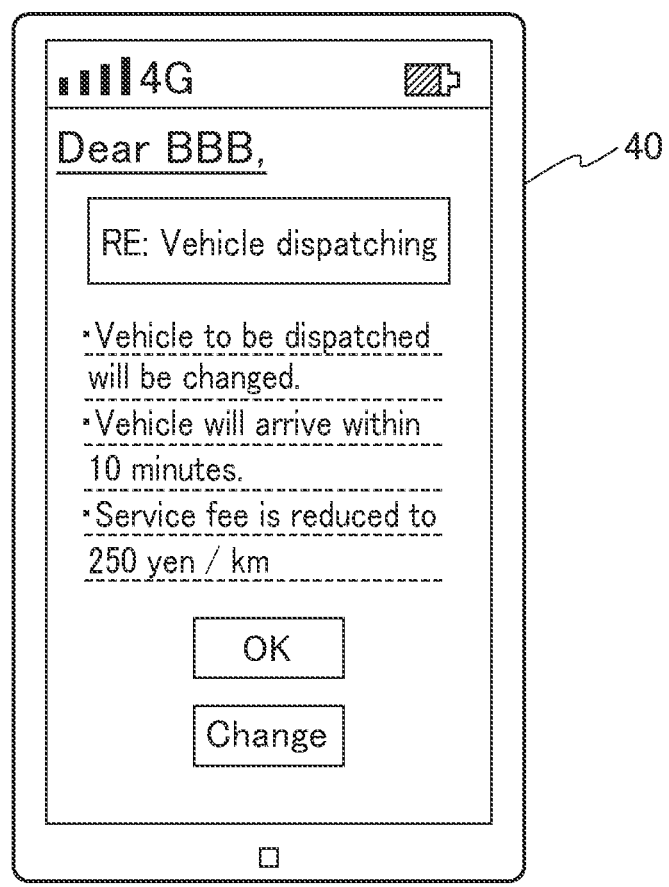
FIG. 13 is a message example (example 2) of a vehicle dispatching content displayed on the communication terminal 40 associated with a user.

FIG. 12 and FIG. 13 show message examples of vehicle dispatching contents displayed on the communication terminal 40 associated with the user. The option execution unit 260 transmits the data of the vehicle dispatching contents that displays the message, based on the selected provision option of the vehicle.

Examples of the vehicle dispatching contents include a scheduled time (vehicle dispatching scheduled time) when the vehicle arrives at a predetermined place, a data relating to the vehicle interior odor (for example, the type, or the odor level), a control state for reducing the odor level in the vehicle, the service fee, and the information relating to change of the contents in booking (for example, change of the service fee, change of the vehicle to be dispatched, or the like). The vehicle dispatching scheduled time may be called a use start time of the vehicle.

Further, in a case in which the provision option that replaces the vehicle with the other vehicle is selected, the option execution unit 260 executes the vehicle control that transfers the other vehicle to the predetermined place (taxi stand). Specifically, the option execution unit 260 instructs the vehicle controller 220 to dispatch the other vehicle (for example, the vehicle 50B) to the taxi stand.

Further, in a case in which the provision option that replaces the vehicle to the other vehicle is selected, the option execution unit 260 instructs a predetermined addressee (for example, cleaning company) to clean the vehicle 50A determined that the odor level does not fulfill the predetermined criterion. Specifically, the option execution unit 260 transmits a message (text or voice message) to an email address or a phone number associated with the predetermined addressee.

(Operation of the Vehicle Management System)

Next, operation of the vehicle management system 10 will be described. Specifically, a vehicle dispatching schematic sequence, a determination flow of the type of the vehicle interior odor, a determination flow of the odor level, and a selection flow of the provision option executed by the vehicle management system 10 are described.

(1) Vehicle Dispatching Schematic Sequence

Figure 5:
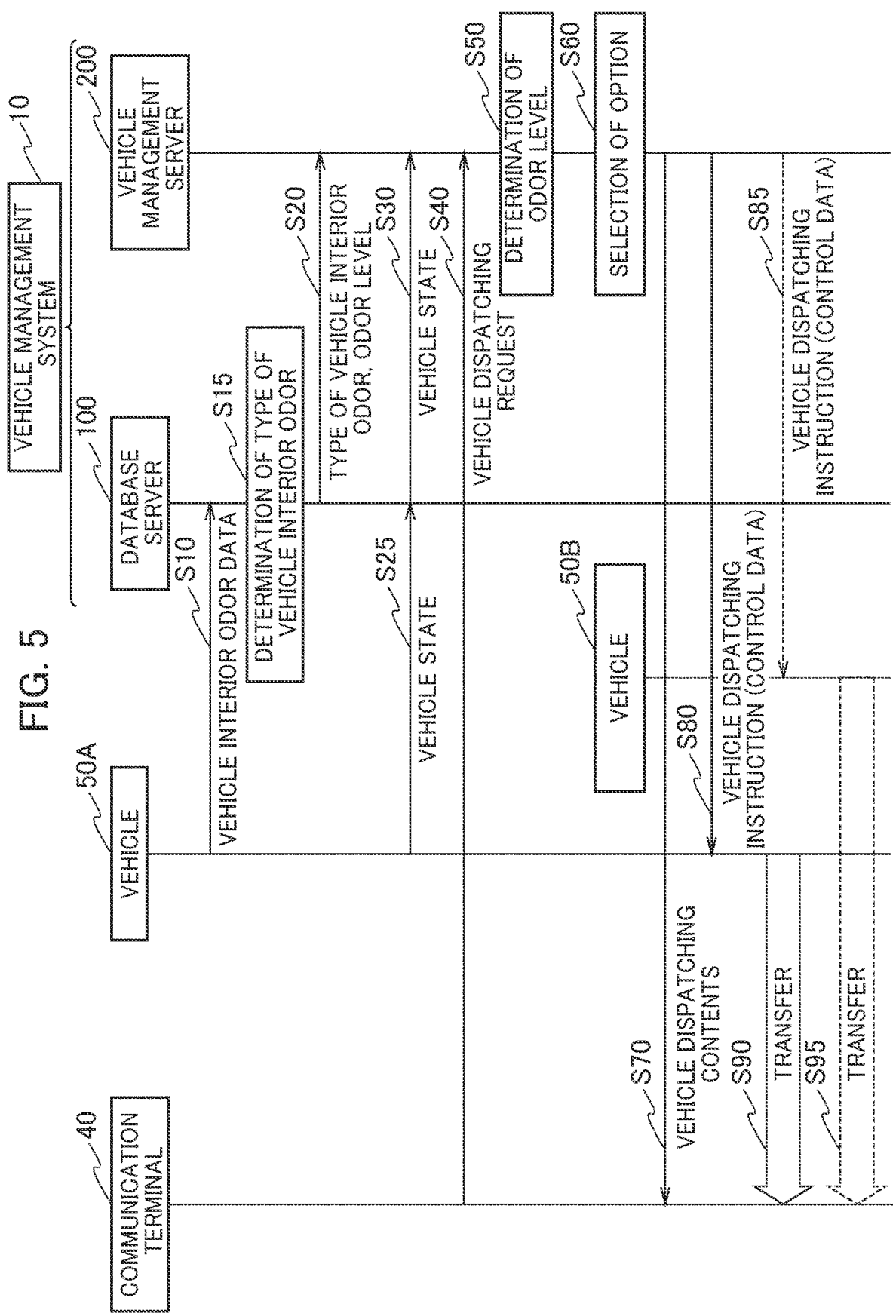
FIG. 5 is a flowchart illustrating a vehicle dispatching schematic sequence executed by the vehicle management system 10.

FIG. 5 shows the vehicle dispatching schematic sequence executed by the vehicle management system 10. Here, the vehicle 50A is scheduled to be dispatched to the user 31, and the vehicle 50A is used as a taxi before dispatched.

The vehicle management system 10 (database server 100) acquires the vehicle interior odor from the vehicle 50A (S10). Specifically, the database server 100 acquires the vehicle interior odor data output by the odor sensor 51 arranged in the vehicle 50A.

For example, in the process of S10, the vehicle 50A may detect that the passenger gets off from the vehicle 50A and then transmit the vehicle interior odor data to the vehicle management system 10.

Or alternatively, when the vehicle management system 10 detects that the vehicle 50A fulfills a predetermined condition, the vehicle management system 10 may transmit a vehicle interior odor request instruction to the vehicle 50A to transmit the vehicle interior odor data and then transmit the vehicle interior odor data acquired from the odor sensor 51 by the vehicle 50A, which receives the vehicle interior odor request instruction, to the vehicle management system 10.

For example, the predetermined condition denotes a case based on the information acquired by the vehicle management system 10 from the vehicle, in which the former passenger got off from the vehicle and the vehicle dispatching for the next passenger has been booked.

The database server 100 determines the type of the vehicle interior odor based on the acquired vehicle interior odor data (S15). The detail of determining the type of the vehicle interior odor will be described below.

The database server 100 transmits the determined type of the vehicle interior odor and the odor level based on the vehicle interior odor data, to the vehicle management server 200 (S20).

Further, the database server 100 acquires the information that indicates the state of the vehicle 50A, specifically the opening/closing state of the window or the like, the temperature and humidity in the vehicle, the state of the air conditioning system and the like, from the vehicle 50A (S25). The database server 100 transmits the information that indicates the state of the vehicle to the vehicle management server 200 (S30).

Further, the vehicle management server 200 receives the vehicle dispatching request from the communication terminal 40 used by the user 31 (S40).

The processes of S10 to S40 do not always follow the sequence shown in FIG. 5. For example, the vehicle dispatching request from the communication terminal 40 (S40) may be generated before the acquisition of the vehicle interior odor data (S10).

The vehicle management server 200 determines the odor level based on the type of the vehicle interior odor, the odor level to be associated with the type of the vehicle interior odor, and the state of the vehicle (S50). Specifically, the vehicle management server 200 determines whether the acquired odor level fulfills the predetermined criterion. The detail of determining the odor level will be described below.

The vehicle management server 200 selects the provision option in accordance with a determined result of the odor level (S60). Specifically, the vehicle management server 200 may select the provision option that replaces the vehicle 50A with other vehicle (here, the vehicle 50B), or the provision option that reduces the service fee for the vehicle 50A. The detail of selecting the provision option will be described below.

The vehicle management server 200 transmits the message that indicates the vehicle dispatching contents to the communication terminal 40, based on the selected provision option (S70).

Further, in a case in which the vehicle management server 200 selects the vehicle 50A, the vehicle management server 200 instructs the vehicle 50A to go to the taxi stand (S80). The vehicle 50A is transferred to the taxi stand, namely near the communication terminal 40 used by the user 31, based on the instruction (S90).

On the other hand, in a case in which the vehicle management server 200 selects the provision option that replaces the vehicle 50A with the vehicle 50B, the vehicle management server 200 instructs the vehicle 50B to go to the taxi stand (S85). The vehicle 50B is transferred near the communication terminal 40 based on the instruction (S95).

(2) Determination Flow of the Type of the Vehicle Interior Odor

Figure 6:
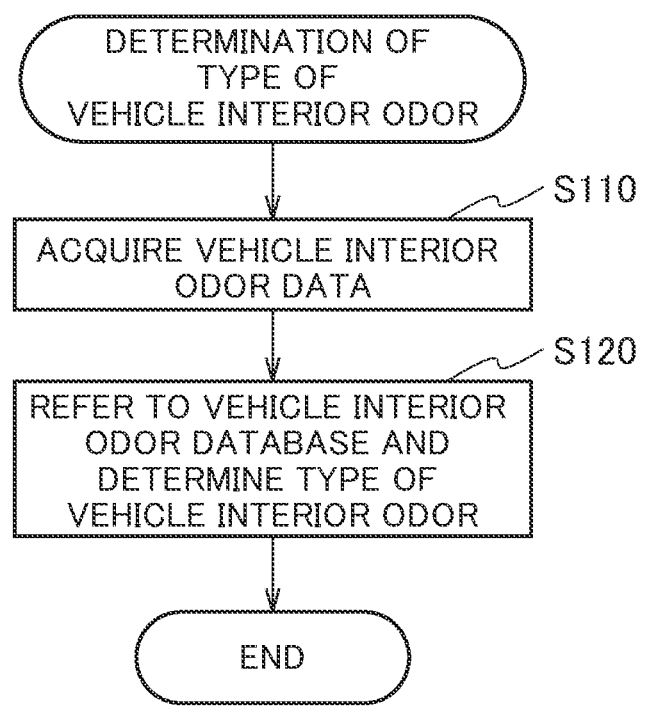
FIG. 6 is a flowchart illustrating a determination flow of a type of a vehicle interior odor.

FIG. 6 shows a determination flow of the type of the vehicle interior odor. As shown in FIG. 6, the vehicle management system 10 (database server 100) acquires the vehicle interior odor data from the vehicle 50A (S110).

The database server 100 refers to the vehicle interior odor database 140 and determines the type of the vehicle interior odor, based on the acquired vehicle interior odor data (S120).

Specifically, the database server 100 determines the type of the vehicle interior odor based on the vehicle interior odor type database shown in FIG. 9. As described above, the vehicle interior odor type database is formed by the rates of the vehicle interior odors (odor components) associated with the types of the vehicle interior odors.

The database server 100 specifies the rate of each of the odor components based on the numerical value (intensity) of each of the odor components output by the odor sensor 51. The database server 100 determines the type of the vehicle interior odor based on the rate (%) of each of the specified odor components.

(3) Determination Flow of the Odor Level

Figure 7:
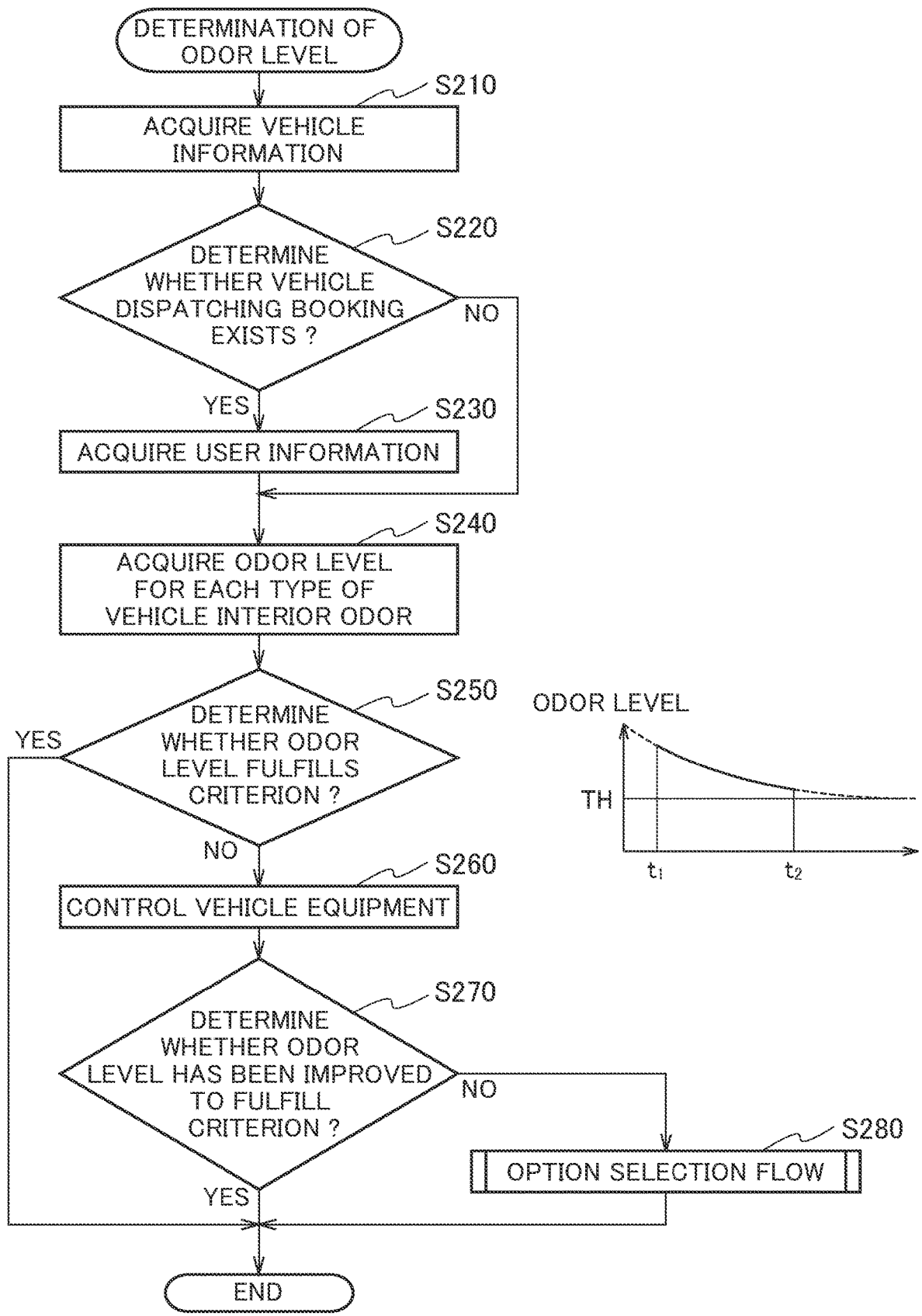
FIG. 7 is a flowchart illustrating a determination flow of an odor level.

FIG. 7 shows a determination flow of the odor level. As shown in FIG. 7, the vehicle management system 10 (vehicle management server 200) acquires the vehicle information of the vehicle 50A (S210). Specifically, the vehicle management server 200 acquires the type of the vehicle 50A, and the environment of the vehicle 50A (a temperature and humidity of an inside and outside of the vehicle).

As described above, a part of the vehicle information may be acquired from the outside via the network cloud 20, and the temperature and humidity of the inside of the vehicle 50A may be acquired via the vehicle state acquisition unit 120 of the database server 100. However, the vehicle dispatching schematic sequence shown in FIG. 5 does not show the detail of the sequence relating to the acquisition of such vehicle information (hereinafter, the same).

The vehicle management server 200 checks presence/absence of the vehicle dispatching booking of the vehicle of which the vehicle information is acquired in the process of S210 (S220).

Specifically, the vehicle management server 200 receives the vehicle dispatching request to the taxi stand, from the communication terminal 40 used by the user 31, and stores the vehicle dispatching booking information in the memory. The vehicle dispatching booking information associates the information relating to the passenger including the vehicle dispatching time, the vehicle dispatching place, and the user included in the vehicle dispatching request, with the information relating to an operation plan including a vehicle to be dispatched and a travelling route of the vehicle to be dispatched. And then the vehicle management server 200 checks the vehicle dispatching booking of the vehicle based on the vehicle dispatching booking information.

The vehicle dispatching request from the communication terminal 40 may be transmitted by an email or using a dedicated application installed in the communication terminal 40.

The vehicle management server 200 acquires the user information of the user 31 associated with the communication terminal 40 based on the vehicle dispatching request from the communication terminal 40 (S230). Specifically, the vehicle management server 200 refers to the user information database 150 shown in FIG. 11 and acquires the user information ("Favorable odor" that the user 31 likes, "Unfavorable odor" that the user 31 dislikes, "Sensitivity" to the odor, and the threshold setting level) of the user 31 ("User AAA").

The processes of S210 to S230 also do not always follow the sequence shown in FIG. 7. For example, the vehicle information may be acquired after the user information.

The vehicle management server 200 acquires the odor level for each type of the vehicle interior odor (S240). Specifically, the vehicle management server 200 refers to the odor level database for each vehicle shown in FIG. 10 and acquires the odor level to be associated with the type of the vehicle interior odor, and the total value of the odor levels in each type.

The vehicle management server 200 repeats the process of S240 at a predetermined time interval (t1, and t2 in the figure).

The vehicle management server 200 determines whether the acquired odor level (each type or total value) fulfills the predetermined criterion (S250). As described above, the predetermined criterion may be changed in accordance with the vehicle information acquired in the process of S210, or the user information acquired in the process of S230.

In a case in which the odor level does not fulfill the predetermined criterion in the process of S250 (for example, a case in which the level of the vehicle interior odor is determined to cause the passenger to feel disgust), the vehicle management server 200 controls the vehicle equipment 53 (S260). Specifically, the vehicle management server 200 transmits the control data for controlling the vehicle 50A, to the vehicle 50A based on the control contents associated with the reducing of the odor level.

The vehicle 50A that receives the control data from the vehicle management server 200 controls various devices forming the vehicle equipment 53 in order to reduce the odor level in the vehicle, based on the control data.

In the present embodiment, the vehicle management server 200 transmits the control data for reducing the odor level in the vehicle, to the vehicle 50A. However, a control program for reducing the odor level in the vehicle may be stored in the vehicle 50A in advance, and the various devices forming the vehicle equipment 53 may be controlled in accordance with the control program.

As described above, the control contents include the opening of the window, the activating of the fan of the air conditioning system, the temperature adjusting of the air conditioning system, the activating of the air cleaner, and the like. Further, the control contents include the control of the electrically openable window, the door, and the tail gate, and the turning on of the ultraviolet (UV) lamp (if applicable, in a case of no passenger). Further, in a case in which it is equipped to the vehicle 50A, the control contents may include activating of a deodorization device (including a device using a chemical reaction), and activating of an ion generator.

The control data may further include a data relating to a position of the window to be opened (front right side, rear left side, or the like), a time for keeping the window opened, a degree of the opening of the window (information relating to an opening area of the window such as full, half, or ⅓ of the window).

Or alternatively, the control data may further include a data relating to the time for activating the deodorization device or the ion generator, and the intensity of the operation thereof.

The vehicle 50A that receives the control data from the vehicle management server 200 controls the various devices forming the vehicle equipment 53, based on the instructions included in the control data.

On the other hand, in a case in which the odor level fulfills the predetermined criterion in the process of S250, the vehicle management server 200 does not especially control the various devices forming the vehicle equipment 53, and the process is finished.

The vehicle management server 200 determines whether the odor level has been improved to fulfill the predetermined criterion, after controlling the various devices forming the vehicle equipment 53 for the purpose of reducing the odor level (S270).

Specifically, similar to the process of S250, the vehicle management server 200 determines whether the odor level (each type or total value) acquired after controlling the vehicle equipment 53 fulfills the predetermined criterion (see TH in the figure). The process of S270 is executed until, for example, the vehicle dispatching scheduled time that dispatches the vehicle to the next passenger.

The vehicle management server 200 may check whether the odor level has been actually improved to fulfill the predetermined criterion based on the acquired result of the odor level repeatedly executed at the predetermined time interval, or alternatively the vehicle management server 200 may determine after executing a predicting process that predicts whether the odor level in the future (for example, at the vehicle dispatching scheduled time), which is presumed based on a difference (degree of reducing) between the odor level at time t1 and the odor level at time t2 shown by a graph illustrated out of the flow in FIG. 7, will be improved to fulfill the predetermined criterion.

The predicting process may predict whether the odor level in the future will be improved to fulfill the predetermined criterion by considering the control contents for reducing the odor level executed between the time t1 and the time t2 by the various devices forming the vehicle equipment 53, in addition to the change (degree of reducing) between the odor level at the time t1 and the odor level at the time t2 shown by the graph illustrated out of the flow in FIG. 7.

For example, a data relating to a contribution level to the reducing of the odor level in the control contents for reducing the odor level that have been executed by the various devices forming the vehicle equipment 53 may be stored in advance, and then a change value of the odor level when the control content of which the contribution level is large will be executed may be predicted, based on a change value of the odor level from the time t1 to the time t2 when the control contents of which the contribution level is small is executed. In this case, the change value in the future may be predicted based on the acquired change value of the odor level and a ratio of both contribution levels.

In a case in which the odor level has been improved to fulfill the predetermined criterion, the vehicle management serve 200 decides that the vehicle 50A will be dispatched as the schedule, and the process is finished.

On the other hand, in a case in which the odor level has not been improved to fulfill the predetermined criterion (or a case in which it is not presumed that the odor level has been improved to fulfill the predetermined criterion until the vehicle dispatching scheduled time), the vehicle management server 200 executes a selection flow for an option (provision option) of the vehicle to be dispatched to the user 31 (S280).

(4) Selection Flow of the Provision Option

Figure 8:
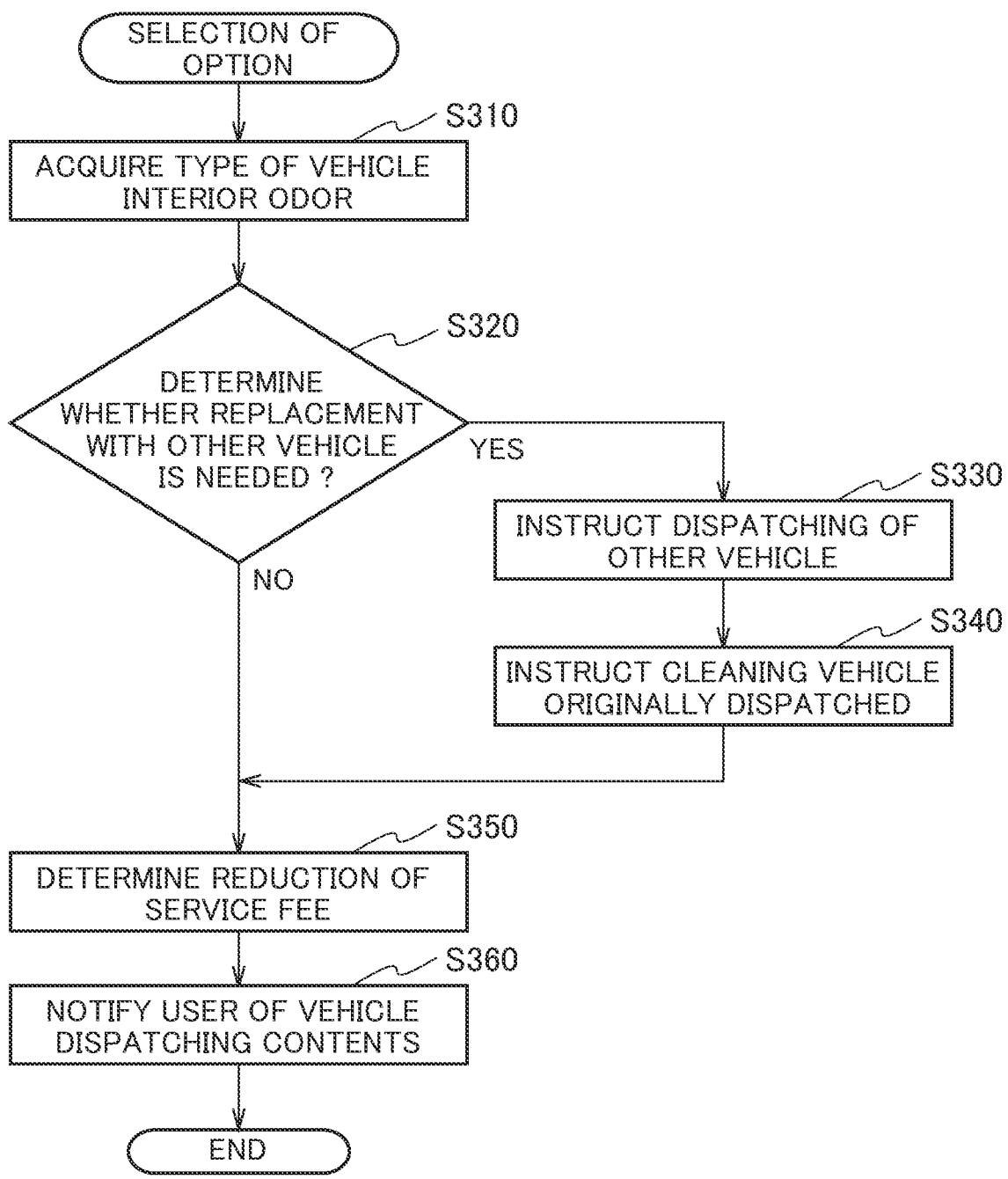
FIG. 8 is a flowchart illustrating a selection flow of a provision option.

FIG. 8 shows a selection flow of the provision option. As shown in FIG. 8, the vehicle management system 10 (vehicle management server 200) acquires the type of the vehicle interior odor generated in the vehicle 50A to be dispatched to the user 31 (S310). Specifically, the vehicle management server 200 acquires the type of the vehicle interior odor acquired by executing the determination flow of the odor level (see FIG. 7).

The vehicle management server 200 determines whether replacement of the vehicle 50A with other vehicle (vehicle 50B) is needed (S320). Specifically, the vehicle management server 200 determines whether the replacement with the vehicle 50B is need, based on the type of the vehicle interior odor.

For example, in a case in which the type of the vehicle interior odor is "Vomit", it is difficult to provide the vehicle 50A as it is. Accordingly, it is determined that the replacement with the vehicle 50 is needed. On the other hand, in a case in which the type of the vehicle interior odor is "Cigarette", the vehicle interior odor still remains to some extent in providing the vehicle 50A to the user 31. Accordingly, it is determined whether the vehicle 50A can be provided by considering the user information of the user 31 (see FIG. 11).

In a case in which the replacement with the vehicle 50B is needed, the vehicle management server 200 instructs the vehicle 50B to go to the taxi stand (S330). Further, the vehicle management server 200 instructs the predetermined addressee (for example, cleaning company) to clean the vehicle 50A originally dispatched (S340). This is because the vehicle 50A is assumed dirty due to the vomit.

In this case, the data for booking the cleaning is transmitted to the predetermined addressee, and the data for cancelling the original vehicle dispatching schedule and the data for instructing the travelling to a geographic place (address or the like) associated with the predetermined addressee such that the vehicle 50A can arrive at the time for which the cleaning is booked to the predetermined addressee are transmitted to the vehicle 50A.

In a case in which the vehicle 50A can be provided, the vehicle management server 200 determines whether the reduction of the service fee is needed (S350).

Specifically, the vehicle management server 200 may reduce the default service fee for the vehicle 50A, based on the type of the vehicle interior odor, the odor level, or the necessary time to dispatch the vehicle (including presence/absence of the delay from the original vehicle dispatching scheduled time) of the vehicle 50A. The vehicle management server 200 may change a fee reduction rate or determine that the fee reduction is not needed, based on the odor level or the contents of the user information.

That is, in the processes of S320, S330, S340, and S350, the change of the vehicle dispatching contents, which has been already booked, is decided. In the example described above, the replacement of the vehicle in the booked vehicle dispatching contents is decided in the processes of S320, S330, and S340, the change of the fee in the booked vehicle dispatching contents is decided in the process of S350, but not limited to this example. For example, it may be decided that the vehicle 50A after the cleaning is dispatched such that the vehicle dispatching scheduled time is delayed until a predetermined time in the vehicle dispatching contents.

The vehicle management server 200 transmits the decided vehicle dispatching contents to notify the user 31, which uses the communication terminal 40, of the vehicle dispatching contents (S360).

FIG. 12 shows a message example of the vehicle dispatching contents when the vehicle 50A is dispatched. Specifically, FIG. 12 shows the message example displayed on the communication terminal 40 as a result of the notification in the process of S360.

As shown in FIG. 12, the information relating to the type (Cigarette) of the vehicle interior odor, the state of the vehicle 50A, the vehicle dispatching scheduled time, and the reduction of the service fee is displayed on the communication terminal 40.

In a case in which the user 31 touches "OK" button, the vehicle dispatching of the vehicle 50A is confirmed, while in a case in which the user 31 touches "Change" button, the screen proceeds to a screen for changing the vehicle dispatching condition.

FIG. 13 shows a message example of the vehicle dispatching contents when the vehicle 50B is dispatched instead of the vehicle 50A. As shown in FIG. 13, the information relating to the change of the vehicle, the vehicle dispatching scheduled time, and the reduction of the service fee is displayed on the communication terminal 40. In a case in which the user 31 touches "OK" button, the vehicle dispatching of the vehicle 50B is confirmed, while in a case in which the user 31 touches "Change" button, the screen proceeds to a screen for changing the vehicle dispatching condition.

The message may further include the following items.
Type of the vehicle interior odor
Detected odor level
Presumed odor level in dispatching the vehicle (boarding)
Delay time from the scheduled vehicle dispatching time
Reason for the reduction of the service fee Further, the message may be transmitted at the following timing except the timing of the process of S360 described above.
When the vehicle dispatching is requested
When the odor level that does not fulfill the predetermined criterion is detected
Before the vehicle dispatching scheduled time by a predetermined time (for example, 30 minutes)

According to the embodiment described above, the following functions and effects can be obtained. Specifically, according to the vehicle management system 10, the type of the vehicle interior odor is determined based on the vehicle interior odor data output by the odor sensor 51, and the odor level to be associated with the type of the vehicle interior odor is acquired from the vehicle interior odor data. Further, it is determined whether the odor level fulfills the predetermined criterion.

Thus, in a case in which it is determined that the odor level in the vehicle does not fulfill the predetermined criterion, the vehicle is not provided to the user. With this, the vehicle of which the odor level in the vehicle fulfills the predetermined criterion can be provided to the user.

Further, the server (database server 100 or vehicle management serve 200), which is arranged at a remote place, receives the vehicle odor data output by the odor sensor 51 of the vehicle and determines whether the odor level in the vehicle fulfills the predetermined criterion. In a case in which the odor level does not fulfill the predetermined criterion, the control data for reducing the odor level is transmitted from the server to the vehicle.

With this, it can be determined at the remote place from the vehicle whether the state of the vehicle is adequate. In a case in which the state of the vehicle is not adequate, the vehicle dispatching for the inadequate vehicle can be cancelled so as to arrange the vehicle dispatching for the substitute vehicle.

In the present embodiment, the vehicle management system 10 determines whether the odor level (for example, the odor level at the time t3 after the time t2), which is presumed based on the change between the odor level at the first time (t1) and the odor level at the second time (t2) after the first time, fulfills the predetermined criterion.

Thus, it can be determined whether the odor level at the actual vehicle dispatching (arrival time of the vehicle at the taxi stand) fulfills the predetermined criterion. With this, an operation rate of the vehicle can be improved, and only the vehicle of which the odor level in the vehicle fulfills the predetermined criterion can be provided to the user.

In the present embodiment, in a case in which the odor level does not fulfill the predetermined criterion, the vehicle management system 10 transmits the control data for controlling the vehicle, to the vehicle based on the control contents associated with the reducing of the odor level.

Further, in the present embodiment, the vehicle management system 10 determines whether the odor level fulfills the predetermined criterion after the control associated with the reducing of the odor level is executed to the vehicle.

Thus, the reducing of the odor level is facilitated. With this, the operation rate of the vehicle can be improved, and only the vehicle of which the odor level in the vehicle fulfills the predetermined criterion can be provided to the user.

In the present embodiment, the vehicle management system 10 determines whether the odor level fulfills the predetermined criterion that is based on the user information. That is, the predetermined criterion can be changed in accordance with the contents of the user information. Thus, both of securing satisfaction of the user to the vehicle interior odor and improving the operation rate of the vehicle can be achieved at a high level.

In the present embodiment, the vehicle management system 10 determines whether the odor level fulfills the predetermined criterion that is based on the vehicle information. That is, the predetermined criterion can be changed in accordance with the type of the vehicle or the environment of the vehicle. Thus, only the vehicle of which the odor level in the vehicle fulfills the predetermined criterion can be provided to the user at higher accuracy.

Further, according to the vehicle management system 10, in a case in which it is determined that the odor level does not fulfill the predetermined criterion, the provision option for the vehicle associated with the odor level is selected. Further, the notification associated with the selected provision option (message notification of the vehicle dispatching contents to the communication terminal 40), or the vehicle control to the vehicle (dispatching the substitute vehicle to the taxi stand) is executed.

In this way, even in a case in which it is determined that the odor level of the vehicle to be provided does not fulfill the predetermined criterion, the vehicle can be provided to the user with an adequate condition in accordance with the odor level in the vehicle by selecting the provision option for the vehicle associated with the odor level.

In the present embodiment, the vehicle management system 10 selects the provision option that replaces the vehicle, which is determined that the odor level thereof does not fulfill the predetermined criterion, with other vehicle. Further, the vehicle management system 10 selects the provision option that replaces the vehicle with other vehicle, based on the type of the vehicle interior odor.

Further, the vehicle management system 10 executes the vehicle control that transfers the other vehicle to the predetermined place (taxi stand).

Thus, in a case in which the odor level of the vehicle interior odor (vomit or the like) cannot be reduced only by controlling the vehicle equipment 53, the other vehicle can be provided immediately. With this, only the vehicle of which the odor level in the vehicle fulfills the predetermined criterion can be provided to the user.

Further, in the present embodiment, in case in which the provision option that replaces the vehicle with other vehicle is selected, the vehicle management system 10 instructs the predetermined addressee (for example, cleaning company) to clean the vehicle originally dispatched.

Thus, the measure to the vehicle, which is determined that the odor level cannot be reduced only by controlling the vehicle equipment 53, can be immediately executed. With this, the operation rate of the vehicle can be improved.

In the present embodiment, the vehicle management system 10 selects the provision option that reduces the service fee for the vehicle. Thus, in a case in which the user can accept the fee reduction, the operation rate of the vehicle can be improved and only the vehicle of which the odor level in the vehicle fulfills the predetermined criterion can be provided to the user. Further, the user can use the vehicle at a low price.

In the present embodiment, the vehicle management system 10 notifies the communication terminal 40 associated with the user to which the vehicle is provided, of the contents of the selected provision option. Thus, even in a case in which the vehicle dispatching contents are changed, the user can check the vehicle dispatching contents immediately. Further, also in a case in which the user cannot accept the vehicle dispatching contents, the user can request the change of the vehicle dispatching contents immediately.

OTHER EMBODIMENTS

As described above, the contents of the present invention are described with reference to the embodiment, however the present invention is not limited to those descriptions. It is obvious for a person skilled in the art to adopt various modifications and improvement.

For example, in the embodiment described above, the odor sensor 51 is arranged in the vehicle 50A, however an odor sensor that detects an odor out of the vehicle may be arranged. By also detecting the odor out of the vehicle, it can be detected whether the detected odor is generated in the vehicle or out of the vehicle, at high accuracy.

Further, the odor sensors 51 may be arranged for respective seats in the passenger cabin. In this case, each odor sensor may have an identifier (ID) that can identify each seat, and the inside or the outside of the vehicle.

In the embodiment described above, each of the vehicle 50A to the vehicle 50C is exemplarily formed as a taxi. However, each of the vehicle 50A to the vehicle 50C may be formed as a vehicle used for car sharing or a rental car. In this case, the vehicle management server 200 manages a use scheduled time of the vehicle of the user.

Further, in the embodiment described above, each of the vehicle 50A to the vehicle 50C has the autonomous driving function of level 4 or more. However, each of the vehicle 50A to the vehicle 50C may have an autonomous driving function of level 3 or less and a driver may board the vehicle.

In the embodiment described above, the vehicle management system 10 is formed by the database server 100 and the vehicle management server 200. However, the database server 100 and the vehicle management server 200 are not distinguished from each other, and the functions of both servers may be provided integrally or dispersedly. That is, as described above, the functions of both servers may be virtually implemented using various services provided on the network cloud 20.

In the embodiment described above, the information forming the user information database 150 may be registered by the user in advance, or may be registered by the user using the communication terminal 40 when using the taxi (requesting vehicle dispatching of the taxi). Furthermore, the user may change the registered contents in accordance with presence/absence of a fellow passenger or a mood in requesting the vehicle dispatching.

In the embodiment described above, the provision option that reduces the service fee for the vehicle 50A is selected. However, the user may receive adequate value (credit) by performing a simple cleaning of the dispatched vehicle, or specifying a source of the vehicle interior odor.

As described above, the embodiments of the present invention are described, however the present invention is not limited to the description and the drawings forming a part of the present disclosure. Various modifications, examples, and operation techniques will be apparent from the present disclosure to a person skilled in the art.

REFERENCE SIGNS LIST

10: vehicle management system
20: network cloud
31, 32: user
40: communication terminal
50A, 50B, 50C: vehicle
51: odor sensor
53: vehicle equipment
55: communication unit
57: equipment controller
59: transmission controller
100: database server
110: vehicle interior odor data acquisition unit
120: vehicle state acquisition unit 130: vehicle interior odor type determination unit
140: vehicle interior odor database
150: use information database
200: vehicle management server
210: odor level determination unit
220: vehicle controller
230: user information acquisition unit
240: vehicle information acquisition unit
250: option selection unit
255: booking information acquisition unit
260: option execution unit

The invention claimed is:

1. A vehicle management system that manages the vehicle provided to a user by dispatching the vehicle to the user, the vehicle management system comprising:
at least a processor and a memory, wherein the processor comprises:
a data acquisition unit that acquires a vehicle interior odor data output by an odor sensor arranged in the vehicle;
a level determination unit that determines whether an odor level, which is based on the vehicle interior odor data, fulfills a predetermined criterion; and
a vehicle controller that transmits a control data for controlling operation of equipment of the vehicle based on control contents associated with reducing of the odor level in direct response to the determination that the odor level does not fulfill the predetermined criterion to control the operation of the equipment of the vehicle, the equipment comprising one or more of an air conditioning system, an electrically openable window, or an ultraviolet lamp,
wherein the level determination unit determines whether the odor level which is acquired after the equipment of the vehicle is controlled based on the control data fulfills the predetermined criterion, and
wherein the processor further comprises:
a selection unit that selects a provision option for replacing the vehicle with an other vehicle having an autonomous driving function that does not need a driver if the odor level which is acquired after the equipment of the vehicle is controlled based on the control data does not fulfill the predetermined criterion; and
an option execution unit that dispatches the other vehicle to a predetermined place to replace the vehicle in direct response to the selection of the provision option by the option selection unit.

2. The vehicle management system according to claim 1, wherein the vehicle is booked for a future use based on a predetermined condition, and the provision option is a condition for which a part of the predetermined condition is changed.

3. The vehicle management system according to claim 2, wherein the provision option is a condition for which at least one of the vehicle, a service fee and a vehicle dispatching scheduled time is changed in the predetermined condition.

4. The vehicle management system according to claim 1, wherein
the processor forms a type determination unit that determines the type of the vehicle interior odor generated in the vehicle, based on the vehicle interior odor data, and
the selection unit selects the provision option that replaces the vehicle with the other vehicle, based on the type of the vehicle interior odor.

5. The vehicle management system according to claim 1, wherein the option execution unit instructs a predetermined addressee to clean the vehicle.

6. The vehicle management system according to claim 1, wherein the selection unit selects a provision option that reduces the service fee for the vehicle.

7. The vehicle management system according to claim 1, wherein the option execution unit notifies a communication terminal associated with the user, of contents of the provision option.

8. A vehicle management method using a server comprising at least a processor, a memory, and a communication interface, for managing a state of a vehicle, the vehicle management method comprising:
acquiring a vehicle interior odor data output by an odor sensor arranged in the vehicle, via the communication interface;
determining a type of a vehicle interior odor from the acquired vehicle interior odor data;
determining whether an odor level, which is based on the vehicle interior odor data, fulfills a predetermined criterion;
transmitting a control data for controlling operation of equipment of the vehicle based on control contents associated with reducing of the odor level in direct response to the determination that the odor level does not fulfill the predetermined criterion to control the operation of the equipment of the vehicle, the equipment comprising one or more of an air conditioning system, an electrically openable window, or an ultraviolet lamp; and
determining whether the odor level which is acquired after the equipment of the vehicle is controlled based on the control data fulfills the predetermined criterion,
wherein the vehicle management method further comprises:
selecting a provision option for replacing the vehicle with an other vehicle having an autonomous driving function that does not need a driver if the odor level which is acquired after the equipment of the vehicle is controlled based on the control data does not fulfill the predetermined criterion; and
dispatching the other vehicle to a predetermined place to replace the vehicle in direct response to the selection of the provision option.

9. The vehicle management system according to claim 1, wherein numerical values for respective components are defined in a case in which plural types of the vehicle interior odors are combined.

* * * * *